United States Patent [19]

Ohdaira et al.

[11] 4,174,335

[45] Nov. 13, 1979

[54] AQUEOUS DISPERSIONS OF OLEFINIC RESIN COMPOSITIONS AND PROCESS FOR PREPARATION THEREOF

[75] Inventors: Akio Ohdaira, Iwakuni; Toru Tomoshige; Kinich Onodera, both of Ohtake, all of Japan

[73] Assignee: Mitsui Petrochemical Industries, Ltd., Tokyo, Japan

[21] Appl. No.: 707,084

[22] Filed: Jul. 20, 1976

[30] Foreign Application Priority Data

Jul. 22, 1975 [JP] Japan .................................. 50-88857

[51] Int. Cl.$^2$ ........................... C08L 23/08; C08J 3/04
[52] U.S. Cl. ..................... 260/29.6 RW; 260/29.7 D; 260/29.7 UA; 260/29.7 W; 525/71; 525/78; 525/82; 525/418; 525/191; 525/301; 525/306; 525/313; 525/240
[58] Field of Search ................. 260/29.7 D, 29.6 WA, 260/29.6 RW, 876 R, 29.7 W, 29.6 PM, 29.7 EM, 29.7 WA, 897 B; 526/317

[56] References Cited

U.S. PATENT DOCUMENTS

| | | | |
|---|---|---|---|
| 2,496,989 | 2/1950 | Cupery | 260/897 B |
| 3,356,629 | 12/1967 | Smith et al. | 260/29.6 PM |
| 3,475,369 | 10/1969 | Blunt | 260/33.6 PQ |
| 3,483,276 | 12/1969 | Mahlman | 260/897 |
| 3,485,785 | 12/1969 | Anspon et al. | 260/29.6 PM |
| 3,658,948 | 4/1972 | McConnell | 260/897 B |
| 3,689,445 | 9/1972 | Hopwood et al. | 260/296 PW |
| 3,769,151 | 10/1973 | Knutson et al. | 260/296 WA X |

*Primary Examiner*—Wilbert J. Briggs, Sr.
*Attorney, Agent, or Firm*—Sherman & Shalloway

[57] ABSTRACT

An aqueous dispersion of an olefinic resin composition having improved properties which comprises mixing an olefinic resin composition comprising (a) 50 to 99% by weight of a carboxyl-free olefinic resin having an intrinsic viscosity of 0.1 to 5 and (b) 1 to 50% by weight of a carboxyl-containing modified olefinic resin having an intrinsic viscosity of 0.04 to 1 and an acid number of 30 to 150, the amount of each resin being based on the total amount of resins (a) and (b), which has been melted by heating to a temperature above the melting point, whichever is higher, of the resins, with an aqueous medium heated to a temperature of 140 to 300° C. in the presence of at least 0.2 chemical equivalent, to the carboxyl groups of resin (b), of a base.

15 Claims, No Drawings

AQUEOUS DISPERSIONS OF OLEFINIC RESIN COMPOSITIONS AND PROCESS FOR PREPARATION THEREOF

This invention relates to an aqueous dispersion of an olefinic resin composition which has improved storage stability, gives coatings of improved properties, and is useful in various applications, for example, for coating various materials such as paper, wooden plates, and metals, and for floor polishing, and to a process for producing the aqueous dispersion.

When olefinic resins are used for bonding, lamination, painting, and coating of paper, wooden plates, metals, etc., it is advantageous from the viewpoint of working environment and flammability to use them in the form of an aqueous dispersion rather than in the form of a solution in an organic solvent. To achieve this, methods have already been developed for preparing aqueous dispersions of polyolefins using surface-active agents or emulsifiers. Since large quantities of the surface-active agents or emulsifiers are required in this method, the surface-active agents or emulsifiers remain in the resulting polyolefin coatings on evaporation of water from the aqueous dispersions, and adversely affect the physical properties of the coatings. In an extreme case, the coated films may become water-soluble. Moreover, the prior methods can only impart water dispersibility to low-molecular-weight polyolefins having a molecular weight of about 3,000 at the highest by using as much as, for example, about 20% by weight or more, of surface-active agents or emulsifiers. It is practically impossible to impart satisfactory water dispersibility to polyolefins having a higher molecular weight so as to obtain coatings having superior properties. It is also known to subject polyolefins to an oxidation treatment in order to improve their water dispersibility, but the improvement attainable is to a low degree, and attempts to increase the degree of improvement inevitably results in the oxidative degradation of the polyolefins.

With a view to overcoming these difficulties by other means, the use of modified polyolefins, particularly carboxyl-containing modified polyolefins was suggested (for example, DT 1,495,707, Canadian Pat. No. 866,250, and British Pat. No. 1,222,548). However, the properties of coatings formed from the resulting aqueous dispersions are still inevitably aggravated because of the considerably high acid number of the modified polyolefins used and the use of much surface-active agents. On the other hand, when the acid number of the modified resins is decreased by restricting the degree of modification, stable aqueous dispersions cannot be obtained. Thus, with such a method, it is still impossible to provide aqueous dispersions of olefinic resin compositions which have satisfactory stability and properties.

As an improvement of the prior methods suggested, Japanese Laid-Open Patent Publication No. 36540/75 laid open on Apr. 5, 1975 suggested a polyolefin composition with an acid number of 1 to 10 having good water dispersibility comprising a mixture of a major proportion of a carboxyl-free olefinic resin having an intrinsic viscosity of not more than 20, especially 0.04 to 20.0, and an acid number of not more than 5, a minor proportion of a carboxyl-containing modified olefinic resin having an acid number of at least 10, particularly 10 to 150, and an intrinsic viscosity of at least 0.04, particularly 0.04 to 1.50, and a surface-active agent in an amount reduced as compared with the prior methods, particularly not more than 10% by weight.

Since according to this suggestion, ordinary carboxyl-free olefinic resins are conjointly used with the conventional modified olefinic resins, and the amount of the surface-active agent can be reduced, the aggravation of the properties of coatings can be avoided to some extent as compared with the prior methods. However, the use of surface-active agents, although in decreased amounts, cannot be omitted, and it is difficult to completely avoid adverse effects on the properties of the resulting aqueous dispersion. Moreover, the stability of an aqueous dispersion of this polyolefin composition is still unsatisfactory.

We conducted investigations in order to overcome the disadvantages of the above suggestion of using a mixture of a major amount of a carboxyl-free olefinic resin and a minor amount of a carboxyl-containing modified olefinic resin. These investigations led to the discovery that an aqueous dispersion of an olefinic resin composition having improved stability and capable of affording coatings with improved properties can be produced by mixing a composition comprising (a) a specified carboxyl-free olefinic resin and (b) a specified carboxyl-containing olefinic resin, which is melted by being heated to a temperature above the melting point, whichever is higher, of these resins (a) and (b), with an aqueous medium heated to a temperature of at least 140° C., particularly 140° to 300° C., in the presence of at least 0.2 chemical equivalent, to the carboxyl groups of the resin (b), of a base.

It has also been found that without the need to use any surface-active agent or a solvent for the resins (a) and (b), it is possible to prepare an aqueous dispersion having superior stability and comprising fine spherical particles free from a surface-active agent each of which consists of the resins (a) and (b) and which have a number average particle size of not more than 3 microns per 100 thereof by mixing the olefinic resin composition heat-melted at specified temperatures with the aqueous medium heated to at least 140° C. (which is in excess of the maximum temperature 130° C. employed in the above-cited suggestion) in the presence of specified amounts of the base.

It is an object of this invention therefore to provide an improved process for producing an aqueous dispersion of an olefinic resin composition.

Another object of this invention is to provide an aqueous dispersion of an olefinic resin composition having improved stability and properties.

The above and other objects and advantages of this invention will become more apparent from the following description.

In the process of this invention, an olefinic resin composition comprising (a) 50 to 99% by weight of a carboxyl-free olefinic resin having an intrinsic viscosity of 0.1 to 5 and (b) 1 to 50% by weight of a carboxyl-containing modified olefinic resin having an intrinsic viscosity of 0.04 to 1 and an acid number of 30 to 150, the amount of each resin being based on the total amount of resins (a) and (b), which has been melted by heating to a temperature above the melting point, whichever is higher, of resins (a) and (b), is mixed with an aqueous medium heated to a temperature of 140° to 300° C. in the presence of at least 0.2 chemical equivalent, to the carboxyl groups of resin (b), of a base.

The composition comprising the resins (a) and (b) at the time of mixing with the aqueous medium may be such that the resins (a) and (b) are in a sufficiently intimately mixed and molten state, and this can be accomplished by any desired means of mixing and melting. For example, the two resins are first mixed and then melted; or the resins are separately melted and then mixed; or the resins are melted while being mixed. For this purpose, a heat-melting vessel equipped with a mixing means, or an extruder type mixing-melting device can usually be employed. In order to obtain the molten composition, the resins are heated to a temperature above the melting point, whichever is higher, of the resins (a) and (b) (a resin having a higher melting point may sometimes be referred to hereinbelow as "a higher melting resin"). Preferably, the melting is carried out at a temperature at least 30° C. higher than the melting point of the higher melting resin, but not higher than 300° C. More preferably, the melting temperature is 140° to 300° C., particularly 170° to 260° C. It is preferred that a suitable temperature be selected within the above range so that the melt viscosity of the molten composition may be at least $10^5$ centipoises.

In the present invention, the melting point of a resin is determined by a differential thermal calorimeter (DSC). When it is impossible to determine the melting point of either one or both of the resins (a) and (b), the temperature at which each of the resins has a melt viscosity of $10^5$ centipoises is regarded as the melting point.

Preferably, the mixing of the molten composition with the aqueous medium, usually water, heated to 140° to 300° C., preferably 170° to 260° C. is carried out with vigorous mechanical stirring. Advantageously, the addition or feeding of the molten composition to the aqueous medium is effected gradually. Any desired means can be used for effecting this addition. For example, the composition consisting of the resins (a) and (b) is heat-melted at the above temperature in a vessel equipped with a mixing device, and the sufficiently mixed molten composition is gradually charged into the heated aqueous medium by means of, for example, a pump. Or while being melt-mixed by, for example, an extruder, the polyolefin composition is added gradually to the heated aqueous medium. The rate of addition of the molten composition is preferably about 1 to 100 g/10 minutes per 1,000 ml of the aqueous medium.

It is preferred that the aqueous medium should not contain a surface-active agent or an organic solvent for the resins (a) and (b). There is no particular restriction on the amount of the resins based on the aqueous medium, but for practical purposes the amount of the resin is, for example, about 20 to 100% by weight based on the aqueous medium. Preferably, the mixing of the heated molten composition with the heated aqueous medium is carried out with vigorous mechanical stirring so that a sufficient shear force may be exerted on the mixture, and the use of pressure vessels or autoclaves equipped with a stirring means of high performance, such as a turbine-type stirring vane, is preferred. Colloidal mills and homomixers can also be utilized.

It is further preferred that after the addition of the molten composition to the heated aqueous medium, the stirring be continued for at least about 30 minutes while maintaining the high temperature conditions as much as possible. The mixing is carried out in the presence of at least 0.2 chemical equivalent, for example, 0.2 to 2.0 chemical equivalent, preferably about 0.5 to about 1.5 chemical equivalent, to the carboxyl groups of the modified olefinic resin (b) (where the carboxyl groups are present in the form of acid anhydride groups, one acid anhydride group is counted as two carboxyl groups), of a base. The base may be added in advance to the molten composition, or to the heated aqueous medium. Alternatively, a part of it may be added to the resin composition, and the remainder to the aqueous medium. Or all of it may be added to the aqueous medium. If desired, it may be added batchwise to the aqueous medium. When it is added in advance to the resin composition, the modified carboxyl groups are neutralized to salts to an extent corresponding to the base added.

During the dispersion of the molten composition of the resins (a) and (b) in the aqueous medium, the carboxyl-containing modified olefinic resin is neutralized to a salt with the basic substance present in the mixture when introduced into the aqueous medium. Since the olefinic resin composition containing the carboxyl-containing modified olefinic resin is at a temperature above the melting point of the higher melting resin, the resins (a) and (b) are converted to spherical particles while being in the mixed state and remaining inseparable, and the carboxylate groups resulting from neutralization tend to appear on the surface of liquid droplets (spheres) because of their moderate hydrophilicity. As a result, these carboxylate groups, it is presumed, continuously facilitate the dispersion of the liquid droplets in the aqueous medium. A stirring action which exerts a high shear force on the mixed dispersion renders the liquid droplets readily divisible into smaller spheres to form a stable aqueous dispersion of fine spherical particles. This phenomenon continues even during the falling of the temperature of the dispersion, and when the temperature of the dispersion has reached room temperature, the liquid droplets of the mixed olefinic resin composition becomes hydrophilic spherical ultrafine particles, and disperses in water in stable condition.

According to the present invention, there is provided a dispersion of (I) spherical fine particles each of which consists of an olefinic resin composition comprising the resins (a) and (b) and which have a number average particle size of not more than 3 microns per 100 thereof and are free from a surface-active agent in (II) an aqueous medium not containing an organic solvent for resins (a) and (b). In the present invention, it is not necessary to add a surface-active agent to the molten composition comprising the resins (a) and (b).

The carboxyl-free olefinic resin (a) used in the present invention is an olefinic resin having an intrinsic viscosity of 0.1 to 5. If its intrinsic viscosity is too low, the desirable properties, for example mechanical strength, of the high-molecular-weight resin are lost, and if it is too high, stable spherical fine particles are difficult to form.

The intrinsic viscosity $[\eta]$ of a resin, as used in the present invention, is calculated from the following equation $$[\eta] = \eta_{sp}/C\,(1 + 0.28\eta_{sp})$$

wherein $\eta_{sp}$ is the specific viscosity of the resin measured on a decalin solution with a concentration (C) of 0.1 g/100 ml.

The carboxyl-containing modified olefinic resin (b) used in this invention has an intrinsic viscosity of 0.01 to 1, usually 0.05 to 1, preferably 0.06 to 0.8, and an acid number of 30 to 150, usually 40 to 150, preferably 50 to 130. If the acid number is too low, it is difficult to form a stable dispersion. If it is too high, only the resin (b) disperses in water as fine particles while the resin (a)

remains undispersed, thus making it impossible to obtain a good quality dispersion.

The acid number, as used in the present invention, denotes the amount in milligrams of potassium hydroxide required to neutralize 1 g of the carboxyl-containing modified olefinic resin.

Examples of the resin (a) suitable for use in the present invention are homo- or copolymers of 1-olefinic unsaturated hydrocarbons containing 2 to 6 carbon atoms; copolymers of the above hydrocarbons with dienes; copolymers of the hydrocarbons with vinyl acetate, or saponification products of the copolymers; graft copolymers of homo- or copolymers of the hydrocarbons with dienes, or saponification products of the graft copolymers; and blends of these resins.

Specifically, they include, for example, (1) homopolymers of 1-olefinic unsaturated hydrocarbons containing 2 to 6 carbon atoms such as ethylene, propylene, 1-butene, or 4-methyl-1-pentene, and copolymers of the hydrocarbons such as an ethylene/propylene copolymer, an ethylene/1-butene copolymer and a propylene/1-butene copolymer; (2) rubbery copolymers of at least two of the above 1-olefins with conjugated or non-conjugated dienes, such as an ethylene/propylene/butadiene copolymer, an ethylene/propylene/dicyclopentadiene copolymer, an ethylene/propylene/ethylidenenorbornene copolymer, an ethylene/propylene/1,5-hexadiene copolymer, or an isobutene/isoprene copolymer; (3) copolymers of 1-olefins with conjugated or non-conjugated dienes such as an ethylene/butadiene copolymer or an ethylene/ethylidenenorbornene copolymer; (4) copolymers of 1-olefins, especially ethylene, with vinyl acetate, and complete or partial saponification products thereof; (5) graft copolymers resulting from the grafting of the conjugated or non-conjugated dienes or vinyl acetate to homo- or copolymers of the 1-olefins, or complete or partial saponification products thereof; and blends of at least two of the above polymers or copolymers.

Examples of the resin (b) suitable for use in the present invention include copolymers of 1-olefinic unsaturated hydrocarbons with $\alpha,\beta$-unsaturated carboxylic acids; saponification products of copolymers of the above hydrocarbons with the functional derivatives of $\alpha,\beta$-unsaturated carboxylic acids; graft copolymers of homo- or copolymers of the hydrocarbons with $\alpha,\beta$-unsaturated carboxylic acids; saponification products of graft copolymers of homo- or copolymers of the above hydrocarbons with the functional derivatives of $\alpha,\beta$-unsaturated carboxylic acids; and blends of these resins. The saponification products may be partial or complete saponification products. Examples of the 1-olefinic unsaturated hydrocarbons containing 2 to 6 carbon atoms or their homo- or copolymers are the same as those given hereinabove with regard to the resin (a). Examples of the modifying $\alpha,\beta$-unsaturated carboxylic acids or their functional derivatives such as the lower alkyl esters, amides or imides thereof are $\alpha,\beta$-unsaturated aliphatic monocarboxylic acids containing 3 to 20 carbon atoms, preferably 3 to 10 carbon atoms, and their functional derivatives, such as acrylic acid, methacrylic acid, crotonic acid, isocrotonic acid, and 1-undecylenic acid. There can also be cited $\alpha,\beta$-unsaturated dicarboxylic acids containing 4 to 20 carbon atoms and the functional derivatives thereof, for example, aliphatic carboxylic acids such as maleic acid, fumaric acid, mesaconic acid, citraconic acid or itaconic acid, 5-norbornene-2,3-dicarboxylic acid, its derivatives resulting from the substitution of methyl at its nucleus, or its derivatives resulting from the substitution of halogen at its endomethylene group, tetrahydrophthalic acid, methyl tetrahydrophthalic anhydride, and tetrahydrophthalic anhydride. The dicarboxylic acids may be in the form of anhydrides.

Methods for producing the modified resins (b) are well known. They can be produced by any of the known techniques, or are commercially available. The known manufacturing techniques include, for example, a method which comprises reacting a homo- or copolymer of a 1-olefinic unsaturated hydrocarbon containing 2 to 6 carbon atoms with an $\alpha,\beta$-unsaturated carboxylic acid (or its anhydride) or its functional derivative in an atmosphere of nitrogen at a temperature of, say, 100° to 250° C. and if desired, in the presence of a solvent and a radical initiator thereby to obtain a graft copolymer. In this method, the reaction system may be in the form of a solventless molten mixture, a solution, a suspension, or an emulsion. The reaction may be effected by a radical initiator, ionizing radiation, or ultraviolet rays. They can also be produced by a known method which comprises subjecting a 1-olefinic unsaturated hydrocarbon containing 2 to 6 carbon atoms and an $\alpha,\beta$-unsaturated carboxylic acid (or its anhydride) or its functional derivative to random copolymerization.

In the preparation of a molten composition comprising the resins (a) and (b), the amount of the resin (a) is 50 to 99% by weight, preferably 70 to 98% by weight, based on the total weight of the resins (a) and (b), and the amount of the resin (b) is 1 to 50% by weight, preferably 2 to 30% by weight, on the same basis.

Any substances which act as bases in water can be used as the base in the process of this invention. Examples of the bases include alkali metals, alkaline earth metals, and the oxides, hydroxides, weak acid salts, and hydrides of these metals; ammonia and ammonium compounds; and amines. Examples of the alkali metals are sodium and potassium, and examples of the alkaline earth metals are calcium, strontium and barium. The amines include, for example, inorganic amines such as hydroxylamine or hydrazine, methylamine, ethylamine, ethanolamine, and cyclohexylamine. Examples of the oxides, hydroxides or hydrides of the alkali metals or alkaline earth metals are sodium oxide, potassium oxide, calcium oxide, strontium oxide, barium oxide, sodium hydroxide, potassium hydroxide, calcium hydroxide, strontium hydroxide, barium hydroxide, sodium hydride, potassium hydride, and calcium hydride. Examples of the weak acid salts of alkali metals and alkaline earth metals are sodium carbonate, potassium carbonate, sodium bicarbonate, potassium bicarbonate, calcium bicarbonate, sodium acetate, potassium acetate, and calcium acetate. The ammonium compounds are, for example, ammonium hydroxide, quaternary ammonium compounds such as tetramethyl ammonium hydroxide, and hydrazine hydrate.

In order to obtain a stable dispersion, it is desirable to perform vigorous mechanical stirring when adding the molten mixture of the resins (a) and (b) to the aqueous medium. Suitably, high shear mixing having an impeller power requirement per unit volume $P_v$(kg.m/m$^3$.sec) of 1,000 to 6,000, preferably 2,000 to 5,000, is carried out using a stirring device having an $N_p/N_{qd}$ value [where $N_p$: power number (dimensionless), and $N_{qd}$: discharge rate number (dimensionless)], which represents the power required to give a discharge flow and is determined by the shapes of the impeller and the vessel, of 6 to 150, preferably 10 to 100, $P_v$ is defined by the following equation $$P_v = P/V\alpha\mu(\dot{\gamma})^2$$

wherein P is the power consumed (kg.m/sec), V is the volume (m³), $\mu$ is the coefficient of viscosity (kg.sec/m²), and $\dot{\gamma}$ is the shear velocity (l/sec).

The pressure homomixer used in Example 1 had an $N_p/N_{qd}$ ratio of 100 and $P_v$ of 5,000. The pressure vessel equipped with a turbine stirrer used in Example 2 had an $N_p/N_{qd}$ ratio of 12 and $P_v$ of 4,000. In the stirring of water designed for ordinary mixing, the $N_p/N_{qd}$ ratio is 0.5 to 2.0 and $P_v$ is 50 to 500. Under such stirring conditions, it is difficult to obtain stable dispersions as attained by the present invention.

The aqueous dispersion obtained in the present invention can be used as prepared, or after partially or wholly neutralizing it.

The aqueous dispersion obtained by the method of the present invention can be used in various applications, for example, for coating paper, paperboards, wooden plates, metals, etc. and for floor polishing. If desired, it may be used in conjunction with binders such as casein, glue, or polyvinyl alcohol, fillers such as calcium carbonate or silica, and crosslinking agents.

The following Examples and Comparative Examples illustrate the process of the invention in greater detail.

REFERENTIAL EXAMPLE 1

Preparation of polyethylene containing a carboxyl group 100 g of polyethylene wax having an intrinsic viscosity of 0.12 and a density of 0.97 g/ml was dissolved in 1000 ml of chlorobenzene at 120° C. In an atmosphere of nitrogen, 0.8 g of dicumyl peroxide, and 25 g of acrylic acid were simultaneously added dropwise over the course of 1 hour, and then, the reaction was continued for another two hours. After the reaction, the reaction mixture was cooled, and 500 ml of acetone was added to precipitate polyethylene containing a carboxyl group, followed by filtration. The filtration cake was washed three times with 500 ml of acetone, and dried. The resulting carboxyl-containing polyethylene had an acid number of 100, an intrinsic viscosity of 0.18, and a melting point of 124° C.

REFERENTIAL EXAMPLE 2

Preparation of modified polypropylene containing a carboxyl group 1,000 g of propylene polymer having an intrinsic viscosity of 0.08 and a density of 0.91 g/ml was heated to 170° C. in an atmosphere of nitrogen to melt it. With stirring, 10 ml of di-tertiary butyl peroxide and 100 g of maleic anhydride were added dropwise over the course of 2 hours, and the mixture reacted at 170° C. for 1 hour. After the reaction, the reaction mixture was maintained at this temperature under a vacuum of 5 mmHg for 1 hour with stirring, thereby to remove the unreacted maleic anhydride and volatile components such as a decomposition product of the peroxide. The resulting carboxyl-containing polypropylene had an acid number of 60, an intrinsic viscosity of 0.12, and a melting point of 152° C.

REFERENTIAL EXAMPLE 3

Maleic anhydride-modified polyethylene was prepared in the same way as in Referential Example 2 except that polyethylene having an intrinsic viscosity of 0.07 and a density of 0.945 g/ml was used instead of the polypropylene. The resulting maleic anhydride-modified polyethylene had an acid number of 45, an intrinsic viscosity of 0.12, and a melting point of 115° C.

REFERENTIAL EXAMPLE 4

Maleic anhydride-modified atactic polypropylene was produced in the same way as in Referential Example 2 except that atactic polypropylene having an intrinsic viscosity of 0.33 and a density of 0.850 g/ml was used instead of the polypropylene. The resulting maleic anhydride-modified atactic polypropylene had an acid number of 47 and an intrinsic viscosity of 0.20, and the temperature at which its melt viscosity became $10^5$ cps was 80° C.

EXAMPLE 1

160 g of polyethylene having an intrinsic viscosity of 0.8, a density of 0.965 g/ml and a melting point of 130° C. was melt-mixed at 200° C. with the acrylic acid-grafted polyethylene wax (having an intrinsic viscosity of 0.18, an acid number of 100, and a melting point of 124° C.) synthesized in Referential Example 1.

A 4-liter pressure homomixer was charged with 1,500 ml of water and 1.5 g (0.52 equivalent to the carboxyl groups in the composition) of sodium hydroxide, and they were heated to 180° C. With stirring at 5,000 rpm, the molten composition of the acrylic acid-grafted polyethylene wax and the polyethylene was fed by a gear pump over the course of 1 hour. The mixture was further stirred for 30 minutes, and then cooled to room temperature. The particles in the resulting aqueous dispersion were spherical. The number average particle size of 100 of these particles was less than 1 micron, and the aqueous dispersion had a B-type viscosity of 7 cps (25° C.). After allowing the dispersion to stand for 7 days, phase separation was not observed at all.

COMPARATIVE EXAMPLE 1

The procedure of Example 1 was repeated except that the amount of sodium hydroxide was changed to 0.3 g (0.1 equivalent to the carboxyl groups in the composition of polyethylene and acrylic acid-grafted polyethylene). The polyolefin composition did not at all disperse, but remained in water as lumps having a diameter of 5 to 1 mm.

EXAMPLE 2

28.5 kg of an ethylene/1-butene copolymer having an intrinsic viscosity of 1.0, a density of 0.940 g/ml and a melting point of 123° C. was melt-mixed with 1.5 kg of an ethylene/acrylic acid copolymer having an intrinsic viscosity of 0.13, an acid number of 75 and a melting point of 100° C. in an atmosphere of nitrogen at 200° C. A 100-liter pressure vessel equipped with a turbine stirrer was charged with 60 liters of water and 100 g (0.89 equivalent to the carboxyl groups in the composition) of potassium hydroxide, and the contents were heated to 200° C. With stirring at 500 rpm, the molten polyethylene composition was fed by a gear pump over the course of 3 hours. After stirring for another 1 hour, the mixture was cooled to room temperature. The particles in the resulting aqueous dispersion were spherical, and the number average particle size of 100 of these particles was less than 1 micron. The aqueous dispersion had a B-type viscosity of 12 cps (25° C.). Even after the dispersion was allowed to stand for 7 days, no phase separation was observed.

COMPARATIVE EXAMPLE 2

The procedure of Example 2 was repeated except that the composition of ethylene/1-butene copolymer and ethylene/acrylic acid copolymer used in Example 2 was charged into water containing potassium hydroxide and having a temperature (120° C.) which was below the higher melting point between the constituents (a) and (b). The particles in the resulting aqueous dispersion were large with a number average particle size of about 30 microns per 100 of the particles, some of which were of a size of about 100 microns. After standing for 1 day, the aqueous dispersion underwent phase separation almost completely.

EXAMPLE 3

160 g of polypropylene having an intrinsic viscosity of 0.3, a density of 0.91 g/ml and a melting point of 165° C. was melt-mixed at 200° C. with the maleic anhydride-grafted polypropylene synthesized in Referential Example 2 (having an intrinsic viscosity of 0.12, an acid number of 60, and a melting point of 152° C.) to form a composition. The resulting composition was dispersed in the same way as in Example 1 in an aqueous solution containing 1.7 g (1.0 equivalent to the carboxyl groups in the composition) of sodium hydroxide at 200° C. The particles in the resulting aqueous dispersion were spherical, and the number average particle size of 100 of these particles was less than 1 micron, and the aqueous dispersion had a B-type viscosity of 8 cps (25° C.). Even after standing for 7 days, no phase separation was observed in the aqueous dispersion.

When the above procedure was repeated except that the amount of sodium hydroxide in the aqueous solution was changed to 0.5 g (0.3 equivalent to the carboxyl groups in the composition—one acid anhydride group is counted as two carboxyl groups). The resulting aqueous dispersion was stable with no phase separation seen even after standing for 7 days. The number average particle size of 100 of these particles was 2 microns, and the particles were uniform spheres.

EXAMPLE 4

60 g of an ethylene/vinyl acetate copolymer having an intrinsic viscosity of 1.2, a density of 0.925 g/ml, a melting point of 102° C. and a vinyl acetate unit content of 7% by weight and 40 g of the acrylic acid-grafted polyethylene wax having an intrinsic viscosity of 0.8, an acid number of 100 and a melting point of 124° C. synthesized in Referential Example 1 were dispersed in water at 220° C. in the same way as in Example 1. The particles in the resulting aqueous dispersion were spherical, and the number average particle size of 100 of these particles was less than 1 micron, and the aqueous dispersion had a B-type viscosity of 7 cps (25° C.). Even after standing for 7 days, no phase separation was observed in the aqueous dispersion.

EXAMPLE 5

A composition consisting of 27 kg of an ethylene/propylene copolymer having an intrinsic viscosity of 0.70, a density of 0.920 g/ml and a melting point of 120° C. and 3 kg of an ethylene/methacrylic acid copolymer having an intrinsic viscosity of 0.5, a melting point of 87° C., a density of 0.94 g/ml and an acid number of 62 was dispersed in the same way as in Example 2 in an aqueous solution at 170° C. containing 132 g of sodium hydroxide (1.0 equivalent to the carboxyl groups in the composition). The particles in the resulting aqueous dispersion were spherical and the number average particle size of 100 of these particles were less than 0.9 micron. The aqueous dispersion had a B-type viscosity of 15 cps (25° C.), and after standing for 7 days, no phase separation was observed in the aqueous dispersion.

EXAMPLE 6

27.0 kg of an ethylene/1-butene copolymer having an intrinsic viscosity of 0.90, a density of 0.945 g/ml and a melting point of 70° C. was melt-mixed with 3.0 kg of maleic anhydride-containing polyethylene having an acid number of 45 and an intrinsic viscosity of 0.12 synthesized by the method of Referential Example 3 in an atmosphere of nitrogen at 170° C. A 100-liter pressure vessel equipped with a turbine stirrer was charged with 60 liters of water and 165 g (1.0 equivalent to the carboxyl groups in the composition) of potassium hydroxide, and with stirring at 350 rpm and 180° C., the molten polyolefin composition obtained was fed into the vessel by means of a gear pump over the course of 4 hours. The mixture was stirred for another one hour, and then cooled down to room temperature. The particles in the resulting aqueous dispersion were spherical, and the number average particle size of 100 of these particles was less than 1 micron, and the aqueous dispersion had a B-type viscosity of 13 cps (25° C.) After standing for 7 days, no phase separation occurred in the aqueous dispersion.

Aqueous dispersions were prepared by the same procedure as described hereinabove except that the intrinsic viscosity of the ethylene/1-butene copolymer and the temperature of the aqueous medium were changed. The average particle size ($\mu$) of the particles in the dispersions were as shown in the following table.

| ($\eta$) of the ethylene/1-butene copolymer | Temperature (°C.) of the aqueous medium | | | |
| --- | --- | --- | --- | --- |
| | 140 | 180 | 210 | 250 |
| 0.5 | 2 | 1 | <1 | <1 |
| 0.9 | 3 | <1 | <1 | <1 |
| 1.5 | 3 | 3 | 1 | <1 |

COMPARATIVE EXAMPLE 3

Acrylic acid was grafted onto polyethylene having an intrinsic viscosity of 0.8, a density of 0.965 g/ml and a melting point of 130° C. in the same way as in Referential Example 1 to obtain acrylic acid-grafted polyethylene having an acid number of 20 which was the same acid number as that of the polyethylene composition used in Example 1. The grafted polyethylene had an intrinsic viscosity of 0.85.

200 g of the grafted polyethylene was melted at 200° C., and a 4-liter pressure homomixer was charged with 1,500 ml of water and 1.5 g (0.52 equivalent to the carboxyl groups in the grafted polyethylene) of sodium hydroxide, and the mixture was heated at 180° C. With stirring at 5,000 rpm, the molten polyethylene wax was placed in water by means of a gear pump over the course of 1 hour. The mixture was stirred for another 30 minutes, and cooled to room temperature. The number average particle size of 100 of the particles in the aqueous dispersion was 50 microns, and after standing for 1 hour, complete phase separation occurred in the aqueous dispersion.

COMPARATIVE EXAMPLE 4

24 kg of an ethylene/1-butene copolymer having an intrinsic viscosity of 0.9, a density of 0.945 g/ml, and a melting point of 120° C. was melt-mixed at 170° C. with 6 kg of maleic acid-grafted polyethylene having an intrinsic viscosity of 0.11, an acid number of 20 and a melting point of 123° C. obtained in the same way as in Referential Example 1 using maleic anhydride instead of the acrylic acid. 30 kg of the resulting composition was dispersed in an aqueous solution containing 120 g (1.0 equivalent to the carboxyl groups in the composition) of potassium hydroxide. The number average particle size of 100 of the particles in the resulting aqueous dispersion was about 50 microns, and the particles were not feasible for practical purposes.

EXAMPLE 7

24.0 kg of atactic polypropylene having an intrinsic viscosity of 0.33 and a density of 0.850 g/ml was melt-mixed with 6.0 kg of maleic anhydride-modified polyethylene prepared in Referential Example 3 and having an acid number of 45 and an intrinsic viscosity of 0.12 in an atmosphere of nitrogen at 170° C. The resulting composition was melted at 125° C. A 100-liter pressure vessel equipped with a turbine stirrer was charged with 60 liters of water and 330 g (1.0 equivalent to the carboxyl groups in the composition) of potassium hydroxide. With stirring at 350 rpm and 180° C., the molten polyolefin composition was fed into the vessel by means of a gear pump over the course of 3 hours. The mixture was stirred for another 1 hour, and then cooled to room temperature. The particles in the resulting aqueous dispersion were spherical, and the number average particle size of 100 of these particles was 2 microns, and after standing for 7 days, the aqueous dispersion was stable.

EXAMPLE 8

A composition consisting of 24.0 kg of atactic polypropylene having an intrinsic viscosity of 0.33 and a density of 0.850 g/ml and 6.0 kg of maleic anhydride-modified atactic polypropylene prepared in Referential Example 4 and having an acid number of 47 and an intrinsic viscosity of 0.20 was dispersed in an aqueous solution at 180° C. containing 345 g (1.0 equivalent to the carboxyl groups in the composition) of potassium hydroxide in the same way as in Example 7. The particles in the resulting aqueous dispersion were spherical, and the number average particle size of 100 of these particles was less than 1.0 micron. After standing for 7 days, no phase separation was observed in the aqueous dispersion.

| Example (Ex.) or Comparative Example (Comp. Ex.) | Component (a) | | | | | Component (b) | | | | | Deri-[1] vation |
|---|---|---|---|---|---|---|---|---|---|---|---|
| | Type | ($\eta$) | Density (g/ml) | Melting point (°C.) | Amount (g) | Starting resin | ($\eta$) | Modifying agent | Acid number | Melting point (°C.) | Amount (g) | |
| Ex. 1 | PE[7] | 0.8 | 0.965 | 130 | 160 | PEwax | 0.18 | ACA[8] | 100 | 124 | 40 | Ref. 1[9] |
| Comp. Ex. 1 | " | " | " | " | " | " | " | " | " | " | " | " |
| Ex. 2 | E/1-B[13] | 1.0 | 0.940 | 123 | 28500 | E/A-CA[14] | 0.13 | — | 75 | 100 | 1500 | |
| Comp. Ex. 2 | " | " | " | " | " | " | " | — | " | " | " | " |
| Ex. 3 | PP | 0.3 | 0.91 | 165 | 160 | PP | 0.12 | MAA[15] | 60 | 152 | 40 | Ref. 2 |
| | " | " | " | " | " | " | " | " | " | " | " | " |
| Ex. 4 | EVA-SP[16] | 1.2 | 0.925 | 102 | 160 | PEwax | 0.18 | ACA | 100 | 124 | 40 | Ref. 1 |
| Ex. 5 | E/P[17] | 0.7 | 0.920 | 120 | 27000 | E/M-CA[18] | 0.5 | — | 62 | 87 | 3000 | |
| Ex. 6 | E/1-B | 0.9 | 0.945 | 70 | 27000 | PE | 0.12 | MAA | 45 | 115 | 3000 | Ref. 3 |
| Comp. Ex. 3 | (PE of Example 1 modified by the method of Referential Example 1) | | | | | | 0.85 | ACA | 20 | 130 | 200 | Ref. 1 |
| Comp. Ex. 4 | E/1-B | 0.9 | 0.945 | 120 | 24000 | PE | 0.11 | MAA | 20 | 123 | 6000 | Ref. 1 |
| Ex. 7 | ATA-PP[19] | 0.33 | 0.850 | 80[20] | " | PE | 0.12 | " | 45 | 115 | " | Ref. 3 |
| Ex. 8 | " | " | " | " | " | ATA-PP | 0.20 | " | 47 | 80[20] | " | Ref. 4 |

| Example (Ex.) or Comparative Example (Comp. Ex.) | Dispersing conditions | | | | Aqueous dispersion | | | |
|---|---|---|---|---|---|---|---|---|
| | Temperature (°C.) | Base[2] (eq) | Stirring speed (rpm) | Introduction[3] time | Particle size ($\mu$) | Shape of particle | Viscosity[5] (cps) | Phase[6] separation |
| Ex. 1 | 180 | 0.52 | 5000 | 1 | <1[10] | Spheres | 7 | >7[11] |
| Comp. Ex. 1 | " | 0.1 | " | " | 5000–1000 | Lumps | — | (12) |
| Ex. 2 | 200 | 0.89 | 500 | 3 | <1 | Spheres | 12 | >7 |
| Comp. Ex. 2 | 120 | " | " | " | 30 | — | — | <1 |
| Ex. 3 | 200 | 1.0 | 5000 | 1 | <1 | Spheres | 8 | >7 |
| | " | 0.3 | " | " | 2 | Spheres | 7 | >7 |
| Ex. 4 | 220 | 0.52 | 5000 | 1 | <1 | Spheres | 7 | >7 |
| Ex. 5 | 170 | 1.0 | 500 | 3 | <0.9 | Spheres | 15 | >7 |
| Ex. 6 | 180 | 1.0 | 350 | 4 | <1 | Spheres | 13 | >7 |
| Comp. Ex. 3 | 180 | 0.52 | 5000 | 1 | 50 | — | — | <1 |
| Comp. Ex. 4 | " | " | " | " | 50 | — | — | <1 |
| Ex. 7 | 170 | 1.0 | 350 | 3 | 2 | Spheres | — | >7 |
| Ex. 8 | 180 | " | " | " | <1 | Spheres | — | >7 |

(1) Method of preparation
(2) Equivalent to COOH in (a)+(b)
(3) Unit is hours
(4) Number average particle size per 100 particles (5) Viscosity measured by a B-type viscometer (25° C.)
(6) The number of days until phase separation occurred
(7) Polyethylene
(8) Acrylic acid
(9) Synthesized by the method of Referential Example 1
(10) Less than 1
(11) No separation even after standing for 7 days
(12) Phase separation occurred immediately
(13) Ethylene/1-butene copolymer
(14) Ethylene/acrylic acid copolymer
(15) Maleic anhydride
(16) Partial saponification product of an ethylene/vinyl acetate copolymer
(17) An ethylene/propylene copolymer
(18) An ethylene/methylacrylic acid copolymer
(19) Atactic polypropylene
(20) Temperature at which the melt viscosity became $10^5$ cps

What we claim is:

1. In a process for producing an aqueous dispersion of an olefinic resin composition the particles of which are composed of a major proportion of carboxyl-free olefinic resin and a minor proportion of carboxyl-containing modified olefinic resin which comprises mixing an olefinic resin composition composed of a carboxyl-free olefin resin selected from the group consisting of homo- and co-polymers of 1-olefinic unsaturated hydrocarbons containing 2 to 6 carbon atoms, copolymers of said hydrocarbons with dienes, copolymers of said hydrocarbons with vinyl acetate, saponified products of copolymers of said hydrocarbons with vinyl acetate, graft copolymers of dienes with said homo- or co-polymers of said hydrocarbons, saponified products of said graft copolymers and blends of these resins having an intrinsic viscosity of not more than 20 and a carboxyl-containing modified olefinic resin selected from the group consisting of copolymers of 1-olefinic unsaturated hydrocarbon containing 2 to 6 carbon atoms with $\alpha,\beta$-unsaturated carboxylic acids, saponified products of copolymers of said hydrocarbons with the functional derivatives $\alpha,\beta$-unsaturated carboxylic acids, graft copolymers of homo- or co-polymers of said hydrocarbons with $\alpha,\beta$-unsaturated carboxylic acids, saponified products of graft copolymers of homo- or co-polymers of said hydrocarbons with the functional derivatives of $\alpha,\beta$-unsaturated carboxylic acids and blends of these resins having an acid number of at least 10 and an intrinsic viscosity of at least 0.04 with an aqueous medium in the presence of a base at an elevated temperature; the improvement wherein an olefinic resin composition comprising (a) 50 to 99% by weight of a carboxyl-free olefinic resin having an intrinsic viscosity of 0.01 to 5 and (b) 1 to 50% by weight of a carboxyl-containing modified olefinic resin having an intrinsic viscosity of 0.04 to 1 and an acid number of 30 to 150, the amount of each resin being based on the total amount of said resins (a) and (b), which has been melted by heating to a temperature above the melting point, whichever is higher, of said resins, is mixed with the aqueous medium heated to a temperature of 140° to 300° C. in the presence of at least 0.2 chemical equivalent, to the carboxyl group of said resin (b), of the base.

2. The process of claim 1 wherein said mixing is accomplished by gradually adding the molten olefinic resin composition to the heated aqueous medium with vigorous mechanical stirring.

3. The process of claim 2 wherein said molten resin composition is added at a rate of 1 to 100 g/10 minutes per 1,000 ml of said aqueous medium.

4. The process of claim 1 wherein said molten resin composition does not contain a surface-active agent.

5. The process of claim 1 wherein said aqueous medium does not contain a solvent for the resins (a) and (b).

6. A process for producing a stable aqueous dispersion of substantially spherical ultrafine, hydrophilic particles composed of a major portion of a carboxyl-free olefinic resin and a minor portion of a carboxyl-containing modified olefinic resin
which comprises
(1) melting an olefinic resin composition (A) comprising
(a) 50 to 99% by weight of a carboxyl-free olefinic resin having an intrinsic viscosity of 0.1 to 5 and
(b) 1 to 50% by weight of a carboxyl-containing modified olefinic resin having an intrinsic viscosity of 0.04 to 1 and an acid number of 30 to 150, the amount of each resin being based on the total amount of resins (a) and (b), to a temperature above the melting point of the resins (a) and (b), wherein said olefinic resin (a) is selected from the group consisting of homo- and copolymers of 1-olefinic unsaturated hydrocarbons containing 2 to 6 carbon atoms, copolymers of said hydrocarbons with dienes, copolymers of said hydrocarbons with vinyl acetate, saponified products of copolymers of said hydrocarbons with vinyl acetate, graft copolymers of dienes with said homo- or co-polymers of said hydrocarbons, saponified products of said graft copolymers and blends of these resins and said modified olefinic resin (b) is selected from the group consisting of copolymers of 1-olefinic unsaturated hydrocarbons containing 2 to 6 carbon atoms with $\alpha,\beta$-unsaturated carboxylic acids, saponified products of copolymers of said hydrocarbons with the functional derivatives of $\alpha,\beta$-unsaturated carboxylic acids, graft copolymers of homo- or copolymers of said hydrocarbons with $\alpha,\beta$-unsaturated carboxylic acids, saponified products of graft copolymers of homo- or co-polymers of said hydrocarbons with functional derivatives of $\alpha,\beta$-unsaturated carboxylic acids and blends of these resins, and
(2) gradually mixing with vigorous mechanical stirring the molten olefinic resin composition in an aqueous medium (B), at a temperature in the range of 140° to 300° C. and in the presence of at least 0.2 chemical equivalents, to the carboxyl groups of resin (b), of a base.

7. The process according to claim 6 wherein the aqueous medium (B) is substantially completely free from surfactants and from organic solvents for resins (a) and (b).

8. The process according to claim 6 wherein the temperature of the molten olefinic resin composition (A) is in the range of from about 140° C. to about 300° C., and the vigorous mechanical stirring is continued for at least about 30 minutes at substantially the mixing temperature.

9. The process according to claim 8 wherein the temperature of the molten olefinic resin composition (A) and the temperature of the aqueous medium (B) are each in the range of about 170° C. to about 260° C.

10. The process according to claim 9 wherein the molten olefinic resin composition (A) is added to the aqueous medium (B) at a rate of 1 to 100 g/10 minutes per 1000 ml of the aqueous medium.

11. The process according to claim 10 wherein the amount of the olefinic resin composition (A) is about 20 to 100% by weight, based on the aqueous medium (B).

12. The process according to claim 6 wherein the base is selected from the group consisting of the oxides, hydroxides, weak acid salts and hydrides of alkali or alkaline earth metals, ammonia, ammonium compounds and amine compounds.

13. The process according to claim 6 wherein there are from about 0.2 to about 2 chemical equivalents, to the carboxyl groups of resin (b) of the base present in the aqueous medium (B) during the mixing step.

14. An aqueous dispersion of (I) spherical fine particles each of which consists of an olefinic resin composition comprising (a) 50 to 99% by weight of a carboxyl-free olefinic resin selected from the group consisting of homo- and co-polymers of 1-olefinic unsaturated hydrocarbons containing 2 to 6 carbon atoms, copolymers of said hydrocarbons with dienes, copolymers of said hydrocarbons with vinyl acetate, saponified products of copolymers of said hydrocarbons with vinyl acetate, graft copolymers of dienes with said homo- or co-polymers of said hydrocarbons, saponified products of said graft copolymers, and blends of these resins having an intrinsic viscosity of 0.1 to 5 (b) 1 to 50% by weight of a carboxyl-contianing modified olefinic resin selected from the group consisting of copolymers of 1-olefinic unsaturated hydrocarbons containing 2 to 6 carbon atoms with $\alpha,\beta$-unsaturated carboxylic acids, saponified products of copolymers of said hydrocarbons with the functional derivatives of $\alpha,\beta$-unsaturated carboxylic acids, graft copolymers of homo- or co-polymers of said hydrocarbons with $\alpha,\beta$-unsaturated carboxylic acids, saponified products of graft copolymers of homo- or co-polymers of said hydrocarbons with the functional derivatives of $\alpha,\beta$-unsaturated carboxylic acids, and blends of these resins having an intrinsic viscosity of 0.04 to 1 and an acid number of 30 to 150, the amount of each resin being based on the total amount of said resins (a) and (b), said particles having a number average particle size of not more than 3 microns per 100 thereof and being free from a surface-active agent, in (II) an aqueous medium not containing an organic solvent for said resins (a) and (b).

15. The aqueous dispersion of claim 14, in which the olefinic resin composition comprises 70 to 98% by weight of the carboxyl-free olefinic resin (a) and from about 2 to 30% by weight of the carboxyl-containing modified olefinic resin (b).

* * * * *